May 7, 1968  L. GLUCKSTEIN ET AL  3,381,602
MANUFACTURE OF BEVERAGES AND THE LIKE
Filed Nov. 12, 1963  3 Sheets-Sheet 2
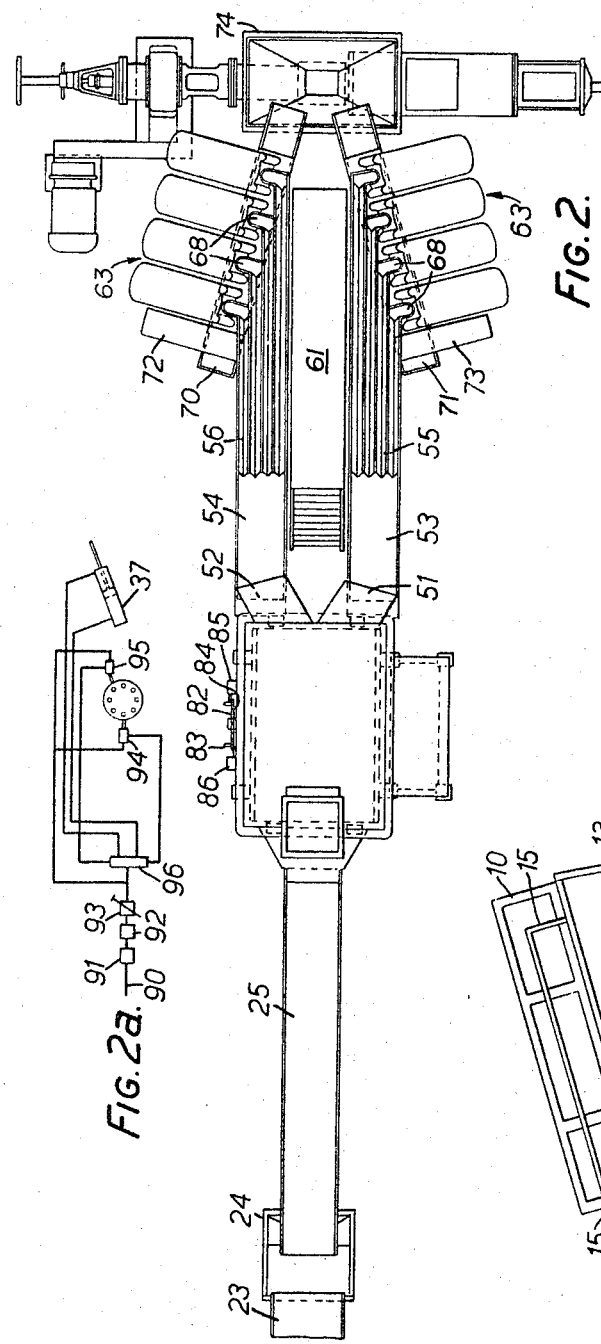
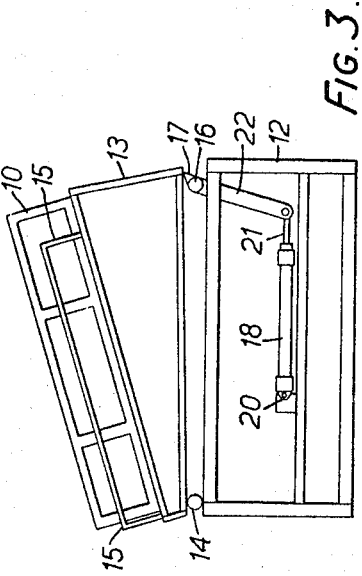
INVENTORS
Leonard Gluckstein
William Tom Everington
BY
Pierce, Scheffler & Parker
ATTORNEYS

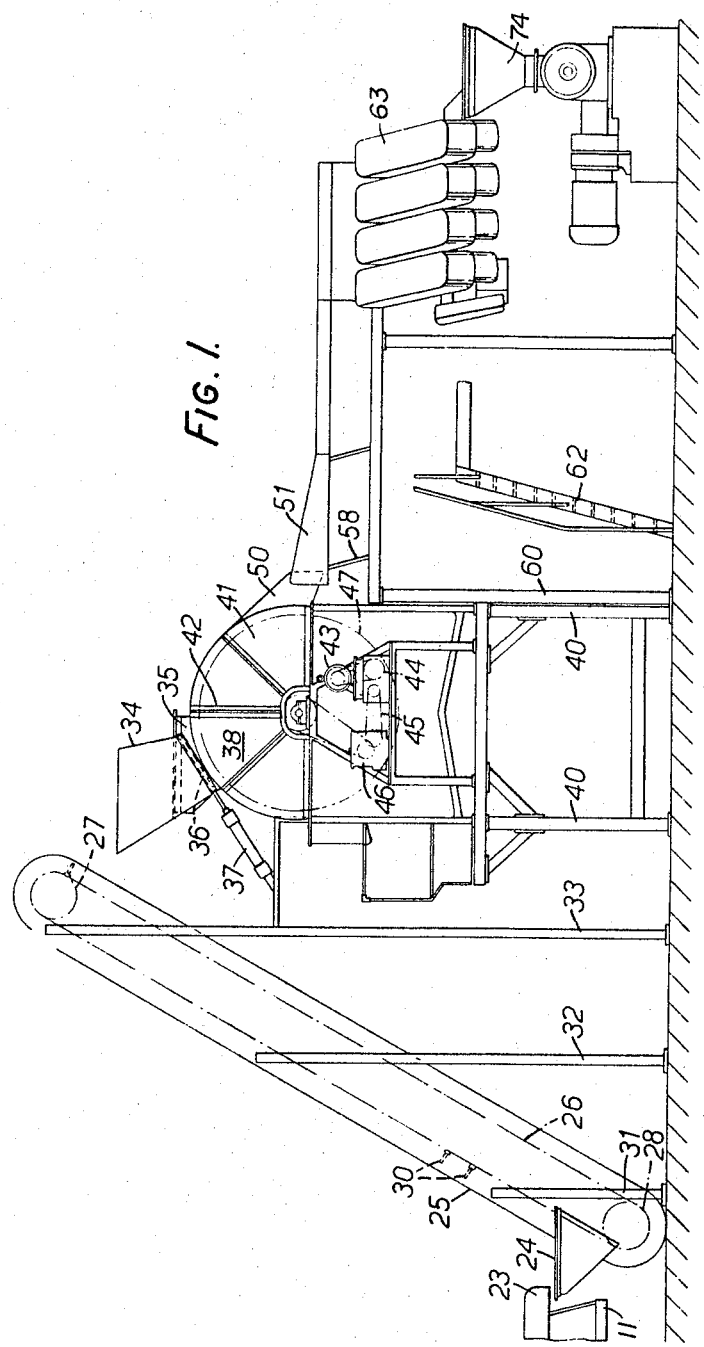

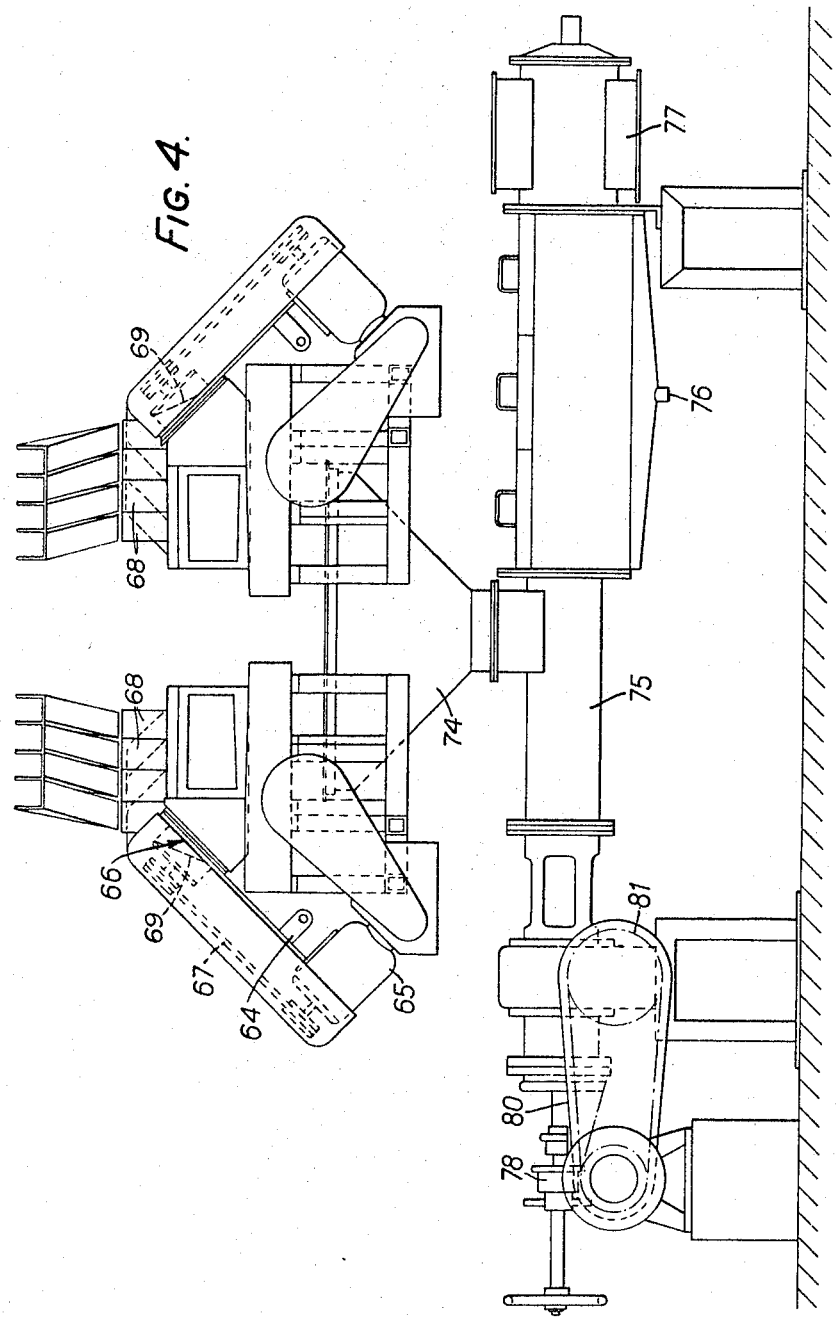

United States Patent Office 3,381,602
Patented May 7, 1968

3,381,602
MANUFACTURE OF BEVERAGES AND THE LIKE
Leonard Gluckstein and William T. Everington, London, England, assignors to J. Lyons & Company Limited, London, England, a British company
Filed Nov. 12, 1963, Ser. No. 323,030
Claims priority, application Great Britain, May 31, 1963, 21,973/63
6 Claims. (Cl. 99—239)

ABSTRACT OF THE DISCLOSURE

Apparatus for production of a citrus fruit product includes a conveyor on which fruit, such as oranges in whole form is brought to an elevator where it is elevated and deposited into a hopper. The fruit is released from the hopper in batches each of which is dropped into a separate section of a Ferris wheel where it is heat treated for a short period and to such an extent that the skin of the fruit is at a higher temperature than the interior thereof. The heat-treated fruit is then discharged from the Ferris wheel onto the rear of two parallel arranged jigging conveyors and is discharged at the front end of each conveyor through vertical guide means onto a bank of high-speed comminuting knife discs inclined at an angle to the guide tubes. The comminuted fruit from each comminuting bank is then deposited into a common hopper from which it discharges into a screw type extractor from which the liquid product and unwanted comminuted fruit solids are separately obtained.

---

This invention relates to the manufacture of beverages and like products from citrus fruits. Oranges are the citrus fruits that are used in the greatest quantity, and the present invention will be described in relation to the manufacture of an orange product, but it will be understood that the invention is not limited in its application to the manufacture of oranges.

It is found in practice that the manufacture of citrus fruit beverages and like products requires great care, inasmuch as variations in the process can unexpectedly give rise to a product which is not acceptable either from a point of view of flavour or of its keeping qualities.

Until comparatively recently, orange fruit products have been made by a batch process, in which whole fruit is comminuted by means of rapidly rotating knives, the comminuted fruit then being added to a sugar syrup, and allowed to stand for a period of time, of some few minutes. Thereafter, the principally liquid product has been separated from the solids, the liquid extract thus obtained affording the base of an orange product which is of good flavour and good keeping qualities, but the need to carry out the process in batches has been a commercial disadvantage.

In copending British application No. 43670/59 now British specification No. 934,348 and in a corresponding U.S. Patent No. 3,069,271 there is described a process which is substantially improved in this respect. In the process described in this copending application, the fruit is first comminuted as before, but is not added to the sugar syrup, but passed to an extraction means where the principally liquid product of comminution is separated from the solid materials by a means which involves the imposition of a gradually increasing pressure upon the comminuted fruit. By avoiding the application of high pressure to the comminuted fruit, of either a sustained or transient nature, it has been found that satisfactory extraction can be obtained, without causing the product to have the bitterness that may be associated with normal pressure extraction, the product also having good keeping qualities. The process described in that application has the advantage of avoiding the discontinuity of batch extraction of the product, and also results in an extract which is of higher concentration than is the case where the comminuted fruit is added to the sugar syrup.

The present invention is concerned with an apparatus for the production of an orange or other citrus fruit product, in which the advantages of the process described in the aforesaid U.S. Patent No. 3,069,271 are supplemented by further advantages, as a result of which a substantially continuous manufacturing process becomes possible. We believe this to be a result which has not previously been attained.

In accordance with one aspect of the present invention there is provided a process for the manufacture of a citrus fruit product which comprises the steps of treating the fruit, and discharging treated fruit in bulk or limited bulk quantities for comminution in a plurality of comminuting devices, wherein the discharged fruit is directed to the comminuting devices by feeding it to a jigging conveyor having a plurality of guideways extending to respective comminuting devices, feeding of the fruit to the guideways being assisted by the jigging action.

In accordance with another aspect of the invention, there is provided apparatus for the manufacture of a citrus fruit product comprising means for treating the fruit, and discharging the treated fruit in bulk or limited bulk quantities, a plurality of devices for comminuting the discharged fruit, and a jigging conveyor having a plurality of guideways extending to respective comminuting devices for directing the discharged fruit thereto, feeding of the fruit to the guideways being assisted by the jigging acton.

Features and advantages of the present invention will appear from the following description of one embodiment thereof, given by way of example, in conjunction with the accompanying drawings, in which:

FIGURE 1 is a side elevational view, partly diagrammatic, of the major components of the apparatus forming this embodiment of the invention;

FIGURE 2 is a plan view, also partly diagrammatic, of the apparatus shown in FIGURE 1;

FIGURE 2a is a fragmentary diagram of the control circuit of the apparatus of FIGURE 2;

FIGURE 3 is a side elevational view of a skip rocker mechanism, and

FIGURE 4 is an end view of the apparatus shown in FIGURES 1 and 2.

In this apparatus, oranges are brought in skips, the fruit being whole and clean, but not sterile. From the skips the fruit is fed on to a conveyor, and thence to an elevator where it is fed in batches of predetermined weight, into the sections of a Ferris wheel structure. In the Ferris wheel the temperature of the fruit is raised, the heating taking place for a period of time which is short enough for the outside skin of the fruit to be at a higher temperature than the inside. From the Ferris wheel the now heated fruit is discharged on to a sectionalised jigging conveyor, and passed to two banks of high speed comminuting knives, the comminuted fruit is then fed from collectors and passed to a screw-type extractor, of a kind resembling that which is described in the aforementioned U.S. Patent No. 3,069,271. From the extractor the liquid product and the unwanted comminuted fruit solids are separately obtained. Turning now to the drawings, clean whole fruit arrives in or is placed in skips, of which one is shown at 10 in FIGURE 3, from which the whole fruit is discharged on to a primary shaker conveyor 11. The skips are supported, at an angle, in a skip support, as shown in FIGURE 3, comprising a base structure 12, conveniently fabricated from steel angle sections, and an upper structure 13 which is pivoted to the base at 14. The upper structure has a retaining rail 15, to hold the skip in position. The end of the upper structure opposite pivot 14 is supported upon a rocker shaft 16, having upon it a number of cams 17. Shaft 16 is rocked by an actuator including a fluid cylinder 18, pivoted at 20 to the base structure 12, the ram 21 of the cylinder being pivoted to a lever 22 fast on shaft 16. A suitable mechanism is provided for reciprocating the ram 21, thereby rocking the shaft, and by the cams 17 causing one end of the skip to be lifted and gently rocked so as to ensure that the fruit will be discharged at its lower end. The fruit thus discharged passes on to conveyor 11.

The whole fruit falls from the end 23 of the conveyor 11 into a hopper 24, feeding the lower end of an elevator 25. Elevator 25 can be of any suitable type, but as is indicated diagrammatically in FIGURE 1, comprises an endless belt 26, passing round upper and lower pulleys 27, 28 and carrying at regular intervals blades 30. The conveyor is supported by a suitable steel structure, of which the standards are indicated at 31, 32, and 33. The belt 26 is driven by an electric motor, not shown, through suitable gearing.

The fruit passes over the top of the elevator belt, and then falls by gravity into a guide 34 and thence into a hopper 35. The bottom of hopper 35 is closed by a removable shutter 36, which can be withdrawn under the control of an actuator 37, consisting of a periodically actuated piston and cylinder unit. Each time that shutter 36 is withdrawn, fruit in the hopper is allowed to pass to one section of a Ferris wheel, indicated generally at 38. The Ferris wheel proper is carried upon a structure 40, which stands directly upon the ground, and is also formed of steel angle sections. The Ferris wheel comprises circular side members 41, braced by steel angle sections 42, and joined by partitions, between the side members, so as to form a plurality of compartments. When the shuttle 36 is withdrawn from hopper 35, the fruit passes into one of these compartments. The Ferris wheel is driven by an electric motor 43 by couplings represented at 44, 45 and 46, so that the Ferris wheel will be slowly rotated. The lower part of the Ferris wheel defines a fruit treating section and is enclosed within a treatment tank, in which treatment liquid, which may be water, is held at high temperature by means of steam pipes, not shown, the axis of the shaft of the Ferris wheel being disposed above the level of the treatment liquid. The fruit in each compartment is retained in that compartment by a cylindrical support baffle the position of which is at 47. The internal baffles of the Ferris wheel are so arranged that after the fruit has passed through the treatment tank, it falls by gravity down a delivery chute 50 which diverts the fruit into two jigger conveyors 51, 52. The speed of the Ferris wheel is so chosen that the fruit, after having passed through the treatment tank, is hotter on the outside than in the interior, which is a suitable condition for the fruit to be in when it is comminuted.

The first section of each jigging conveyor, at 53, 54 respectively is smooth surfaced, these parts leading to sections 55, 56 where the fruit is guided by means of corrugated guides, as is shown in FIGURE 2. The fruit will accordingly pass down these last sections of the conveyor in four lines on each conveyor. The conveyors are carried on flexible supports 58 from a supporting structure 60 resting on the ground. Between the two conveyor lines is a cat walk 61 and an access ladder 62. The conveyors are actuated by electric motors, not shown.

At the end of the corrugations 55 and 56 the fruit falls by gravity through vertically disposed guide means 68 shown in FIGS. 2 and 4 into the entrance openings of a series of converters arranged in two banks 63. The converters are all of the same type, and comprise, as shown in FIGURE 4 a main support 64, carrying at one end an electric motor 65, which drives a rotary knife blade 66 by means of a belt drive 67. These knives are of known kind, and consist each of a disc having in it a series of radial slots, the edges of the slots on the upper side of the disc being raised and sharpened. The fruit is fed to the upper side of the knife disc and whilst it is held by a guide means 69 within the converter is extremely rapidly sliced into small fragments. This comminution takes place without any substantial crushing of the fruit, which is a very desirable feature. It will be observed that the knife discs are arranged at an angle to the vertical and hence the guide means 68, and this also is advantageous in practice as it ensures that under the force of gravity alone, the fruit will be presented to the surface of the disc and be correctly comminuted. The fruit feeds simply and directly into the opening of the converter, ensuring more reliable operation.

The comminuted fruit, passing through the knife discs, falls into one of two collector channels 70, 71, arranged below the inlets to the converters. In each of the two channels is arranged a screw-feed conveyor, driven by electric motors in housings 72 and 73, impelling the comminuted fruit along the channels and causing it to fall into a collector hopper 74.

Hopper 74 leads to a screw-type extraction means, of the type also used in the apparatus described in the aforementioned U.S. Patent No. 3,069,271. The device comprises a feed screw, of gradually decreasing pitch along its length towards its delivery end, fitting closely within a cylindrical outer perforated retainer. The stem of the feed screw may also increase in diameter along the length of the screw, with the result that there is a gradually increasing pressure exerted upon the material within the feed screw as it progresses along it. By this means, the principally liquid proportion of the comminuted fruit is caused to be expressed by the action of the feed screw, and passes through the perforations of the retainer, to one exit at 76, whilst the principally solid materials discharged from the end of the feed screw pass to a further outlet 77, from which they can be conveyed to waste. The extraction press 75 is driven by means of a suitable prime mover such as an electric motor 78, through a belt drive 80 and worm drive arranged within a housing 81.

The apparatus is made largely automatic in operation, though the size of the machine warrants a general human supervision. The automatic control is therefore concerned principally with means for timing the operation of the baffle 36, and for this purpose there is provided on the shaft of the Ferris wheel a cam plate 82 having series of pegs 83 and 84 on its inner and outer surfaces, which co-operate with cam-follower structures in assemblies 85 and 86.

The control circuit can be arranged in the manner indicated in the fragmentary diagram of FIGURE 2a, forming part of FIGURE 2. As shown, a primary air source at 90 passes through a separator 91, filter 92 and flow control valve 93 to pilot valves 94, 95, associated with the assemblies 85 and 86. The pilot valves in turn determine the operation of a main control valve 96; the valve 96 controls the supply of actuating air to one or other of the ends of the shutter actuating cylinder 37.

Means are also provided for controlling the feed of fruit by elevator 25, to prevent overfeed of fruit into the Ferris wheel.

The apparatus described affords completely continuous process of manufacture of a citrus fruit beverage of high quality and good keeping properties and respresents in both capacity and efficiency a substantial improvement over apparatus which has hitherto been used commercially.

We claim:
1. Apparatus for the manufacture of a citrus fruit product from whole fruit comprising means for treating the whole fruit, means discharging the treated fruit from said fruit treating means, a plurality of devices for comminuting the discharged fruit, a jigging conveyor receiving the treated fruit at one end thereof and having a plurality of guideways extending to respective comminut- ing devices for directing the treated fruit thereto, and a generally vertically disposed guide means associated with each said comminuting device for guiding the treated fruit from said conveyor into said comminuting device, each said comminuting device having a rotatable knife disc arranged at an angle to said vertical guide means, and the fruit during comminution being presented to the surface of the disc under the force of gravity along.

2. Apparatus according to claim 1, and including further guide means for maintaining the fruit in contact with the knife disc during comminution.

3. Apparatus according to claim 1 wherein said means for treating the fruit comprises a Ferris wheel rotatable within a treatment tank containing a treatment liquid held at an elevated temperature.

4. Apparatus according to claim 3 and which further includes a hopper located in advance of and feeding fruit into the sections of said Ferris wheel, said hopper including a shutter controlling discharge of the fruit therefrom, and means for effecting periodic operation of said shutter.

5. Apparatus according to claim 4 wherein said means effecting periodic operation of said shutter on said hopper includes a cam on the rotatable shaft supporting said Ferris wheel, a cam follower, and a piston and cylinder unit controlled by said cam follower and which is connected to said shutter for actuating the same.

6. Apparatus according to claim 1 wherein said means for treating the fruit comprises a Ferris wheel rotatable within a treatment tank containing a treatment liquid held at an elevated temperature, and which further includes a hopper located in advance of and feeding fruit into sections of said Ferris wheel, said hopper including a shutter controlling discharge of the fruit therefrom, and means for effecting periodic operation of said shutter which includes a cam on the rotatable shaft supporting said Ferris wheel, a cam follower, and a piston and cylinder unit controlled by said cam follower and which is connected to said shutter for actuating the same.

References Cited
UNITED STATES PATENTS

| | | | |
|---|---|---|---|
| 2,799,218 | 7/1957 | Leslie | 100—37 |
| 3,036,921 | 5/1962 | Rietz | 99—239 |
| 3,195,446 | 7/1965 | French | 100—37 |

ROBERT W. JENKINS, *Primary Examiner.*